United States Patent [19]

Brand et al.

[11] 3,930,774
[45] Jan. 6, 1976

[54] EXTRUDER CONTROLLER

[75] Inventors: Ronald W. Brand, Columbus, Ohio; Richard A. Forbes, Springfield, Ill.; Robert L. Heiks, Columbus, Ohio; Bruce A. Huber, Boston, Mass.

[73] Assignee: Industrial Nucleonics Corporation, Columbus, Ohio

[22] Filed: July 24, 1973

[21] Appl. No.: 382,062

[52] U.S. Cl. ............... 425/141; 425/145; 264/40
[51] Int. Cl.² ............................................. B29D 3/06
[58] Field of Search ....... 425/140, 141, 145; 264/40

[56] References Cited
UNITED STATES PATENTS

| | | | |
|---|---|---|---|
| 3,286,302 | 11/1966 | Doering | 425/145 X |
| 3,307,215 | 3/1967 | Gerhard et al. | 425/141 |
| 3,399,262 | 8/1968 | Quackenbush et al. | 264/210 R X |

FOREIGN PATENTS OR APPLICATIONS

| | | | |
|---|---|---|---|
| 207,864 | 5/1957 | Australia | 425/140 |

*Primary Examiner*—R. Spencer Annear
*Attorney, Agent, or Firm*—William T. Fryer, III; Allan M. Lowe, Esq.; Walter W. Nielsen

[57] ABSTRACT

Thickness of a sheet being produced by an extruder is controlled in response to measurements of: sheet thickness, the speed at which material is fed through a screw of the extruder, as determined by screw speed, and the speed with which material is taken away from the extruder, as determined by sheet speed. Measured thickness is compared with a setpoint for sheet thickness and a determination is made as to whether the thickness is in a predetermined, deadband region relative to the setpoint, or if the sheet is out of the deadband because it is excessively thin or excessively thick. In response to the sheet thickness being in the deadband region, the screw speed is changed in response to a signal indicative of the product of sheet speed error and rate of change of screw speed with respect to sheet speed. Sheet speed is controlled by multiplying sheet speed error by a predetermined constant. In response to the sheet being excessively thin, screw speed, if it has not reached a maximum value, is changed by multiplying sheet thickness error by rate of change of screw speed with respect to sheet thickness; if the screw speed has reached a maximum value, sheet speed is changed by multiplying the thickness error by the rate of change of sheet speed with respect to thickness. In response to the sheet being excessively thick outside of the deadband region and the sheet speed has not reached a predetermined maximum, line speed is changed by multiplying sheet thickness error by the rate of change of sheet speed with respect to sheet thickness; if the line speed has reached the predetermined maximum, screw speed is changed in response to an indication of the product of sheet thickness error and rate of change of screw speed with respect to sheet thickness. The various rates of change are calculated from an equation which models sheet thickness, T, screw speed, $V_S$, and sheet speed, $V_L$, in accordance with:

$$T = a + b \frac{V_S}{V_L} + c \frac{V_S}{V_L^2},$$

where:
  $a$, $b$ and $c$ are predetermined constants determined for each extruder machine and associated apparatus.

17 Claims, 4 Drawing Figures

EXTRUDER CONTROLLER

FIELD OF THE INVENTION

The present invention relates generally to extruder controllers and more particularly to an extruder controller for throughput and thickness, wherein the control is based upon a model equation of the extruder.

BACKGROUND OF THE INVENTION

In extruder devices, it is desired to control sheet thickness and throughput, the rate at which extruder sheet is produced by the extruder. Throughput is determined, inter alia, by the rate at which plastic material is fed through the extruder by a screw, or the rate at which a sheet is removed from the extruder by a roller responsive to the plastic sheet coming from a die head of the extruder. The rate at which the sheet is removed from the extruder is frequently referred to as take-away speed. Take-away speed is directly related to throughput because it controls the amount of material fed by the extruder to a processor or a windup reel downstream of the extruder. Take-away speed also has an effect on sheet thickness because the sheet is in a plastic, deformable state as it is withdrawn from the extruder die by a take-away or cold roll. Another factor controlling take-away speed and thickness of an extruded sheet is the rate at which material is fed through the extruder, i.e., screw speed. Thickness is controlled by screw speed because the amount of material fed through the extruder in a predetermined time interval is directly related to the amount of material withdrawn from the extruder during a time interval of the same duration. Because plastic material in an extruder can be considered as having constant density and the direct relationship between input and output material of the extruder, thickness is a linear function of screw speed. Screw speed has an effect on throughput because the thickness of a sheet is directly related to throughput.

Throughput is properly defined in the prior art as sheet weight per unit area multiplied by sheet width multiplied by take-away speed. Since the sheet has a constant density, its weight per unit area is directly proportional to its thickness, which in turn is controlled as a direct function of screw speed. In modern extruders, sheet width is maintained constant by knives positioned downstream of the extruder die head so that sheet width is not generally a throughput variable factor. Thereby, throughput can be controlled in response to screw speed or take-away speed.

One prior art reference, U.S. Pat. No. 3,286,302 to Doering, for controlling throughput and thickness of a plastic sheet produced by an extruder includes, in one embodiment, a sheet thickness gauge for deriving a signal that controls take-away speed of a sheet from an extruder and screw speed for supplying material to the extruder. The thickness signal is compared with a thickness set point to derive a sheet thickness error signal that is employed to activate a controller for the speed with which the sheet is taken away from the extruder. The sheet thickness signal is also multiplied by a sheet speed indicating signal to derive an indication of measured throughput. The indication of measured throughput is compared with a setpoint for throughput to derive an error signal for controlling screw speed.

BRIEF DESCRIPTION OF THE INVENTION

In accordance with the present invention, we have found that control of sheet thickness and throughput can be more accurately provided by providing a mathematical model representing sheet thickness, sheet takeaway speed (line speed) and the rate at which material is fed to an extruder die, as indicated by screw rotational speed. Through a regression analysis performed on data taken from measurements of many actual on-line extruders, we have found that the following equation relates these three variables:

$$T = a + b \frac{V_S}{V_L} + c \frac{V_S}{V_L^2} \qquad (1)$$

where:
T = sheet thickness,
$V_L$ = line or sheet speed,
$V_S$ = screw speed,
a, b and c are predetermined constants determined for each extruder machine and associated apparatus, as ascertained by the regression analysis from the machine measurements.

From Equation (1), it is possible to determine certain rates of change which are important in controlling an extruder in accordance with the present invention. In particular, the rate of change of screw speed with respect to line speed is determined as:

$$\frac{\delta V_S}{\delta V_L} = \frac{V_L (T-a)(bV_L + 2c)}{(bV_L + c)^2} \qquad (2),$$

the rate of change of screw speed with respect to thickness is determined from:

$$\frac{\delta V_S}{\delta T} = \frac{V_L^2}{bV_L + c} \qquad (3),$$

and rate of change of line speed with respect to sheet thickness is determined from:

$$\frac{\delta V_L}{\delta T} = - \frac{V_L^3}{V_S (bV_L + 2c)} \qquad (4).$$

Equation (2) is helpful, in certain instances in accordance with the specifically disclosed embodiment, in computing a change to be made to screw speed, while Equations (3) and (4) are used under other conditions for determining changes to be made to screw speed and line speed, respectively.

In accordance with one particular aspect of the invention, the type of control employed is based upon a determination of the magnitude of the thickness error. In response to the thickness error not exceeding a predetermined deadband value, screw speed and line speed are simultaneously or concomitantly controlled. Screw speed change is calculated by multiplying rate of change of screw speed with respect to line speed, as derived by Equation (2), by an indication of line speed error, as determined by comparing measured line speed and a line speed setpoint. Line speed changes are calculated by multiplying a predetermined constant by line speed error.

In response to the sheet thickness being outside of the deadband such that the sheet is excessively thin, a determination is made as to whether screw speed has reached a maximum value. In response to the screw speed being less than maximum, the screw speed is increased by multiplying the thickness error by the rate of change of screw speed with respect to thickness, as determined by Equation (3). If screw speed is not at its maximum value, no change in line speed is provided. However, if the screw speed is at the maximum value, beyond which it cannot go without detrimental effects on the extruder or extruded product, screw speed is not changed, but line speed is decreased by multiplying sheet thickness error by rate of change of line speed with respect to sheet thickness, as determined from Equation (4).

In response to sheet thickness being outside of the deadband such that the sheet is excessively thick, a determination is made as to whether the line speed has reached a maximum level. In response to the line speed being less than the maximum level, beyond which increases in line speed can result in detrimental effects to the extruder or extruded product, the line speed is increased by multiplying sheet thickness error by the rate of change of sheet speed with respect to sheet thickness, as derived from Equation (4). If the line speed has reached the maximum value, screw speed is decreased by multiplying sheet thickness error by the rate of change of screw speed with respect to sheet thickness, as derived from Equation (3).

It is accordingly, an object of the present invention to provide a new and improved extruder controller wherein sheet thickness and throughput are controlled.

An additional object of the present invention is to provide a new and improved sheet thickness and throughput controller for an extruder wherein line speed and screw speed of the extruder are controlled in response to parameters derived from an equation modeling sheet thickness, screw speed and line speed.

An additional object of the present invention is to provide a new and improved extruder controller for substantially maximizing throughput while controlling sheet thickness.

A further object of the invention is to provide a new and improved extruder controller where different types of controls are provided in response to indications of predetermined limits being reached.

The above and still further objects, features and advantages of the present invention will become apparent upon consideration of the following detailed description of one specific embodiment thereof, especially when taken in conjunction with the accompanying drawing.

DETAILED DESCRIPTION OF THE DRAWING

Figure 1:
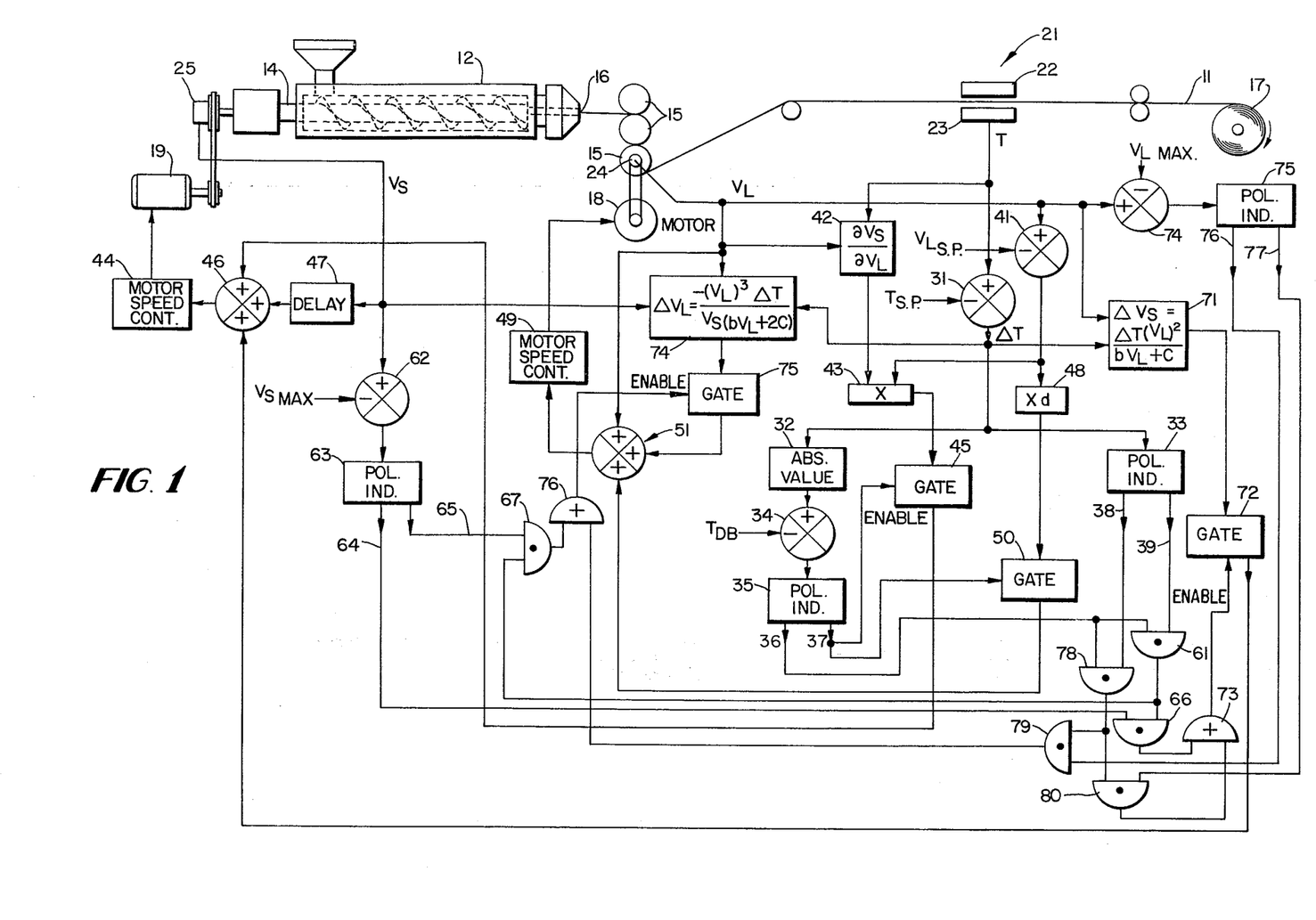
FIG. 1 is a block diagram of a preferred embodiment of the invention.

Reference is now made specifically to FIG. 1 of the drawing wherein there is illustrated a block diagram of a system for controlling the thickness, T, and throughput of a plastic sheet 11 formed by a plastic sheet extruding machine 12, which may be of the type disclosed in U.S. Pat. No. 3,015,129 to Hays et al. Extruder 12 and the material therein are such that plastic sheet 11 is deformable as it is fed to chrome rolls 15 from extruder die head 16. From chrome rolls 15, sheet 11 is constantly supplied to an output station, such as windup reel 17, or in the alternative to the station that intermittently processes individual sheet segments. In either case, sheet 11 is constantly withdrawn from die heat 16 and continuously passes around chrome rolls 15 to the output station.

Throughput of the extruder machine is thereby dependent upon the take-away or line speed, $V_L$, of sheet 11 from extruder 12, which speed is in turn responsive to the rotational velocity of rolls 15 which are driven by variable speed motor 18. Throughput is also dependent on the weight per unit area of formed sheet 11, which is equivalent to sheet thickness, $T$, since sheet density may be considered as constant. Another factor affecting throughput is sheet width, which can be considered constant since knives (not shown) are provided to trim the sheet edges. Throughput of the extruder machine can therefore be determined from $V_L T$. Sheet thickness, however, is directly proportional to the amount of material supplied to die head 16, which in turn is directly proportional to the rotational speed, $V_S$, of screw 14 which is driven at variable rotational speeds by motor 19. Sheet thickness is an inverse function of take-away speed, $V_L$ because of the drawing effect on the sheet as it is pulled from die head 16.

To control the thickness of sheet 11 and throughput of the process, sheet line speed and the rotational velocity of screw 14 are measured, as is the thickness of sheet 11 after the sheet thickness has been stabilized, between chrome rolls 15 and take-away rolls 17. To these ends, a non-contacting sheet thickness gauge 21 is provided between rolls 15 and 17. The non-contacting sheet thickness gauge is preferably a radiation type gauge, familiar to those skilled in the art, and including a penetrating radiation source 22 and detector 23, positioned on opposite sides of sheet 11. Detector 23 derives a signal having an amplitude directly related to the thickness of sheet 11, and for the purposes of the present disclosure the signal derived from detector 23 can be considered as directly proportional to the sheet thickness. To monitor line speed, $V_L$, a tachometer generator 24 is connected to the shaft of one of chrome rolls 15. The output signal of tachometer generator 24 is, therefore, directly proportional to the sheet take-away speed or line speed. The rotational speed, $V_S$, of screw 14 is monitored by tachometer generator 25 that is mounted to be responsive to the rotatinal speed of screw 14.

Control of the thickness of sheet 11 and throughput is provided by varying the speed of sheet 11 and screw 14 by applying control signals to motors 18 and 19. The control signals for motors 18 and 19 are responsive to the measurements of sheet thickness, $T$, line speed, $V_L$, and screw speed, $V_S$. Controllers for the values of $V_L$ and $V_S$ are based upon Equation (1), supra, which we found relates these three variables. In response to the sheet thickness being within a predetermined magnitude on either side of the sheet thickness setpoint (referred to as sheet thickness deadband) both line speed, $V_L$, and screw speed, $V_S$, are simultaneously or concomitantly controlled. In response to the sheet thickness being outside of the deadband region, only one of screw speed or line speed is controlled at a time until the thickness is again in the deadband region or a maximum screw or line speed is reached. Thereby, it is necessary initially to determine if the sheet thickness is within or outside of the deadband region.

To this end, the sheet thickness indicating output signal of gauge 21 is compared with a sheet thickness setpoint, $T_{SP}$, in a subtraction network 31 which derives an output signal $\Delta T = T - T_{SP}$. The $\Delta T$ indicating output signal of substraction network 31 is fed in parallel to absolute value circuit 32 and polarity indicating circuit 33. Absolute value circuit 32 derives a position output signal, regardless of the polarity of the $\Delta T$ output signal of network 31. The magnitude of the output signal of absolute value circuit 32 is equal to the magnitude of the $\Delta T$ signal derived from network 31. The magnitude of the signal derived from absolute value circuit 32 is compared with the magnitude of a signal indicative of the deadband limit, $T_{DB}$, about the thickness setpoint. The comparison is preformed in subtraction network 34 which derives a position valued output signal in response to the thickness of sheet 11 being outside of the deadband and a negative or zero magnitude signal in response to the sheet thickness being within the deadband.

To derive bilevel signals indicative of the thickness being within or outside of the deadband, the output signal of difference network 34 is supplied to polarity indicating network 35 which includes a pair of output leads 36 and 37. Polarity indicating network 35 responds to the polarity of the output signal of network 34 to derive on lead 36 a binary 1 signal value indicative of the output signal of network 34 being greater than zero, thereby indicating the sheet thickness being outside of the deadband. In response to the output signal of network 34 being zero or negative, polarity indicating circuit 35 derives a binary 1 level on output lead 37. The binary 1 output signals on leads 36 and 37 are mutually exclusive, whereby one and only one of the leads derives a binary 1 signal at a time.

Polarity indicating circuit 33 is similar to polarity indicating circuit 35, but derives mutually exclusive binary one signals on output leads 38 and 39 which respectively indicate that the thickness of sheet 11 is greater than and less than the setpoint thickness. To this end, polarity indicating circuit 33 responds to the output signal of subtraction network 31 to derive a binary 1 signal on lead 38 in response to the output signal of network 31 being positive. A binary 1 signal is derived by circuit 33 on output lead 39 in response to the output signal of subtraction circuit 31 being zero or negative.

In response to the sheet thickness being within the deadband region, as indicated by a binary 1 output signal on lead 37 of polarity indicating circuit 35, the values of screw speed, $V_S$, and line speed, $V_L$, are simultaneously or concomitantly controlled.

Required changes in screw speed, $\Delta V_S$, to achieve desired thickness and throughput are found by determining the line speed error, i.e., the deviation between measured line speed and a setpoint for line speed, and multiplying the error signal by a signal proportional to rate of change of screw speed with respect to line speed. The line speed error signal is derived from tachometer generator 24 with a line speed setpoint, $V_{LSP}$, in subtraction network 41 which derives an output line speed error signal, $(V_L - V_{LSP})$. The output signal of subtraction network 41 is combined with an output signal of computer circuit 42 which is indicative of the rate of change of screw speed with respect to line speed, $(\delta V_S/\delta V_L)$. Computer circuit 42, described infra in detail, responds to the thickness output signal, $T$, of gauge 21 and the line speed signal, $V_L$, from tachometer 24, as well as the system constants $a$, $b$ and $c$, to derive the rate of change of screw speed with respect to line speed signal as indicated by Equation (2) supra. The $(\delta V_S/\delta V_L)$ and $(V_L - V_{LSP})$ output signals of circuits 42 and 41 are combined in multiplying network 43 which derives an output signal in accordance with:

$$\Delta V_S = \frac{\delta V_S}{\delta V_L}(V_L - V_{LSP}) = \frac{V_L(T-a)(bV_L+2c)(V_L-V_{LSP})}{(bV_L+c)^2} \quad (5)$$

The value of $\Delta V_S$ in Equation (5) is indicative of the change which should be imparted to the speed of screw 14 to correct for deviations in line speed from the setpoint value for a particular thickness and throughput of sheet 11.

Since the sheet thickness is in the deadband region, the output signal of multiplier 43 is supplied to a conventional motor speed controller 44 for motor 19 that drives screw 14. To this end, the output signal of multiplier 43 is passed through gate 45, enabled by the binary 1 output level on lead 37 which indicates that the sheet thickness is within the deadband region. The $\Delta V_S$ output signal of gate 45 is applied as one input to summing circuit 46. The value of $\Delta V_S$ supplied to summing network 46 modifies the screw speed value, $V_S$, as derived from tachometer generator 25. Because of the transport lag between screw 14 and thickness gauge 21 the value of $V_S$ is delayed in delay network 47 by a time equal to the transport lag time from approximately the middle of screw 14 to thickness gauge 21. The output signal of delay network 47 is added to the value of $\Delta V_S$ in addition network 46, the output of which is fed to motor speed controller 44.

To provide concomitant control of line speed and screw speed while the sheet thickness is in the deadband region, the line speed error signal, $V_L - V_{LSP}$, derived from subtraction network 41 is multiplied by a predetermined, fixed constant in network 48. The output signal of network 48 controls the speed of motor 18 via motor speed control circuit 49. Since the thickness of sheet 11 is within the deadband region, the binary one output of polarity indicator 35 on lead 37 opens gate 50 to pass the output signal of circuit 48 to one input of adding network 51. A second input of adding circuit 51 is responsive to the line speed indicating output signal of tachometer generator 24, and the resultant sum derived from network 51 is applied as an input signal to motor speed controller 49. Thereby, the line speed error signal modifies the actual line speed to provide a virtually instantaneous correction to line speed and therefore throughput.

In response to the measured sheet thickness being excessively thin outside of the deadband region, the speed of screw 14 is increased, thereby increasing the thickness of sheet 11, until the sheet thickness reaches the deadband region or until the screw speed reaches a maximum value where detrimental effects to the sheet or the machine are likely to occur. While the speed of screw 14 is being changed, the speed of sheet 11 is maintained constant at a setpoint value commensurate with desired throughput. If the speed of screw 14 reaches the maximum value, sheet thickness is controlled to approach its setpoint value at the expense of decreased throughput by reducing line speed and holding screw speed at the maximum value.

To these ends, an indication that the sheet thickness is outside of the deadband and the sheet is excessively thin is derived by combining in AND gate 61 the binary 1 output signals on leads 39 and 36 of polarity indicating circuits 33 and 35. The output signal of AND gate 61 is a binary one level only in response to the sheet thickness being outside of the deadband region and the sheet thickness being excessively thin. The binary 1 output signal of AND gate 61 is combined with binary 1 indications indicative of the speed of screw 14 relative to the maximum, predetermined value for screw speed to derive binary signals indicative of the speed of screw 14 being less than the maximum value or equal to or above the maximum value.

To derive the binary signals indicative of the speed of screw 14 relative to the maximum value, the output signal of tachometer generator 24 is compared with the value of maximum screw speed, $V_{MAX}$, in difference network 62. The output signal of difference network 62, $V_S - V_{SMAX}$, is supplied to polarity indicating circuit 63 which derives output signals on leads 64 and 65 having mutually exclusive binary one values. In response to the output signal of network 62 being negative, polarity indicating circuit 63 derives a binary one level on output lead 64 to indicate that the speed of screw 14 is less than the maximum value. To indicate that the speed of screw 14 is at or above the maximum value, polarity indicating circuit 63 derives a binary one signal on lead 65 in response to a zero or positive output signal being derived by difference circuit 62. The binary 1 signals on leads 64 and 65 are respectively combined with the output signal of AND gate 61 in AND gates 66 and 67. Thereby, AND gate 66 derives a binary 1 signal only in response to the sheet thickness being excessively thin outside of the deadband region and the speed of screw 14 being less than the maximum value for it. AND gate 67 derives a binary one signal only in response to the thickness of sheet 11 being excessively thin outside of the deadband region and the speed of screw 14 being equal to or greater than the maximum value.

in response to a binary one signal being derived from AND gate 66, the speed of screw 14 is increased in accordance with:

$$\Delta V_s = \frac{\delta V_s}{\delta T} \Delta T = \frac{V_L^2 \Delta T}{bV_L + c} \quad (6),$$

where:

$\Delta T = T - T_{SP}$, the thickness error output signal of difference circuit 31.

The value of $(\delta V_S/\delta T)$ is determined in computer 71, discussed infra, in accordance with Equation (3) supra in response to the measured line speed, $V_L$, as derived from tachometer 24 and the predetermined constants $b$ and $c$. In computer 71, the value of $\Delta T$ is multiplied by $(\delta V_S/\delta T)$ to derive an output signal indicative of $\Delta V_S$, the increase in the speed of screw 14 necessary to achieve the desired sheet thickness. The output signal of computer 71 modifies the previous speed of screw 14 by being coupled to an additional input of summing network 46 via gate 72. Gate 72 is enabled in response to the binary 1 output of AND gate 66 which is coupled through OR gate 73, whereby the screw speed is increased in accordance with Equation (6) in response to the sheet thickness being excessively thin outside of the deadband region and the speed of screw 14 being less than the maximum value. The output signal of computer 71 is continued to be gated to one of the inputs of summing network 46 to the exclusion of the output signal of multiplier 43 until the sheet thickness again reaches the deadband region or the screw speed reaches the predetermined maximum value. In the former case concomitant screw and line speed control are provided, while in the latter case, gate 72 is disabled and the speed of screw 14 is clamped to the maximum value which is monitored by tachometer 25.

In response to the screw speed reaching the maximum value while the sheet thickness is excessively thin outside of the deadband region, a binary 1 signal is derived from AND gate 67, as described supra. The binary 1 output signal from gate 67 results in decreased throughput since the speed of sheet 11 must be decreased to provide the desired increased sheet thickness. The sheet speed is decreased by combining the thickness error signal, $\Delta T$, as derived from difference network 31, with a signal indicative of rate of change of line speed with respect to thickness, $(\delta V_L/\delta T)$, in accordance with:

$$\Delta V_L = \frac{\delta V_L}{\delta T} \Delta T = - \frac{V_L^3 \Delta T}{V_S(bV_L + 2c)} \quad (7)$$

The value of $(\delta V_L/\delta T)$ is determined by computer 74 in response to measurements of line speed and screw speed as derived from tachometers 24 and 25 in accordance with Equation (4) supra. Computer 74 is also responsive to the $\Delta T$ indicating output signal of difference circuit 31, as well as predetermined constants $b$ and $c$. The output signal of computer 74 decreases the speed of motor 18 by being applied through gate 75 to one input of adding circuit 51. Gate 75 is enabled to couple the output of computer 74 to an input of network 51 in response to a binary 1 signal being derived from AND gate 67 and coupled through OR gate 76. Gate 75 remains enabled until the thickness of sheet 11 has increased sufficiently to reach the deadband region, at which time the deadband control discussed supra again prevails.

In response to the sheet thickness being outside of the deadband region and the sheet being excessively thick, the sheet thickness is controlled by increasing throughput, i.e., by increasing the line speed $V_L$ until a maximum line speed is reached or the sheet thickness achieves the deadband region. In response to the line speed reaching the maximum value, sheet thickness is further decreased by reducing the speed of screw 14.

To these ends, the measured line speed, $V_L$, as derived from tachometer 24 is compared with a predetermined value for maximum line speed, $V_{LMAX}$, in subtraction network 74. The output signal of subtraction network 74, $(V_L - V_{LMAX})$, is supplied to polarity indicating circuit 75 which derives a binary 1 signal on output lead 76 in response to the output signal of subtraction circuit 74 being negative to indicate that the maximum line speed of sheet 11 has not been reached. In response to the maximum line speed having been reached or exceeded, subtraction circuit 74 derives a zero or positive output signal which actuates polarity indicating circuit 75 such that a binary 1 signal is derived on output lead 77. Thereby, the derivation of binary 1 signals on output leads 76 and 77 of polarity indicating circuit 75 are mutually exclusive. To derive an indication that the sheet is excessively thick outside of the deadband region, binary 1 output signals on leads 36 and 38 of polarity indicating circuits 35 and 33 are combined in AND gate 78. A binary 1 level is thereby derived from AND gate 78 only in response to the sheet being excessively thick outside of the deadband region. The binary 1 signal derived from AND gate 78 is combined in AND gates 79 and 80 with the binary signals on leads 76 and 77. Thereby, AND gate 79 derives a binary 1 level only in response to the sheet being excessively thick outside of the deadband region and the line speed being less than the maximum value, while AND gate 80 derives a binary 1 level only in response to the sheet being excessively thick and the line speed being equal to or greater than the maximum value for it.

The binary 1 output signal of AND gate 79 is coupled through OR gate 76 to the enable input of gate 75, whereby the speed of sheet 11 is increased in accordance with Equation (7) until the sheet thickness reaches the deadband region or the line speed reaches the maximum value. In response to the line speed reaching the maximum value, the line speed is clamped to that value since gate 75 is closed. Simultaneously, a binary 1 signal is derived from AND gate 80 and coupled through OR gate 72 to the enable input of gate 72, whereby the speed of screw 14 is decreased in response to the output signal of computer 71, as represented by Equation (6).

Figure 2:
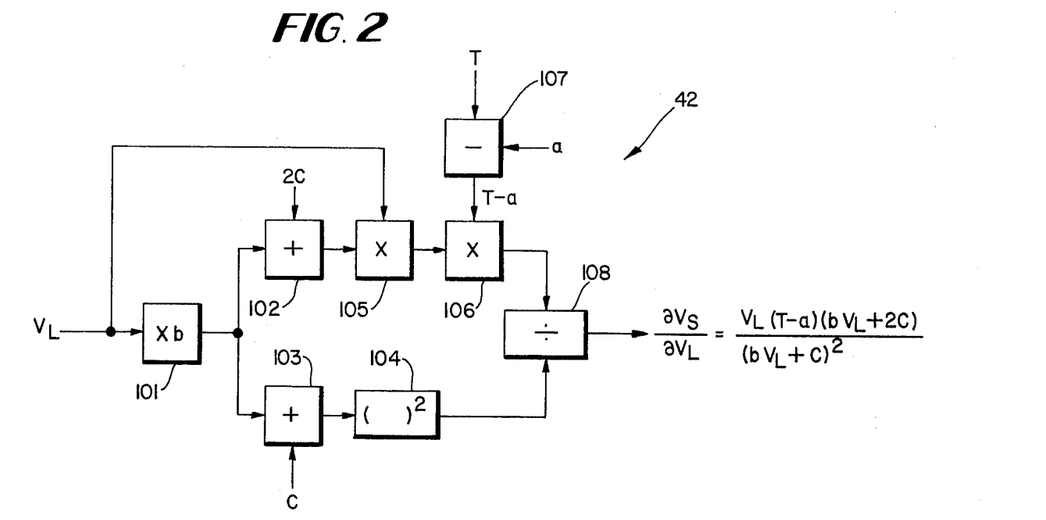
FIG. 2 is a block diagram of a rate of change of screw speed with respect to line speed computer employed in the system of FIG. 1.

Reference is now made to FIG. 2 of the drawing wherein there is illustrated in block diagram form computer 42 for determining rate of change of screw speed with respect to line speed, as calculated in response to signals derived from thickness gauge 21 and tachometer generator 24 which respectively derive signals indicative of $T$ and $V_L$. Computer 42 is also responsive to predetermined constants $a$, $b$ and $c$ indicative of properties of the extruding machine.

The line speed indication derived from tachometer generator 24 is multiplied by the predetermined constant $b$ in scaling network 101 which drives adding networks 102 and 103 in parallel. Adding circuit 103 is responsive to a signal representing the predetermined constant $c$ to derive an output signal indicative of $bV_L+C$. The output signal of adding circuit 103 is supplied to squaring circuit 104. Adding circuit 102 is responsive to a signal indicative of $2c$ to derive an output signal indicative of $2c + bV_L$. The output signal of adding circuit 102 is multiplied by the value of $V_L$ in multiplier 105, the output of which is fed to one input of multiplier 106, having a second input indicative of $(T-a)$ as derived from difference network 107 that is responsive to the output signal of thickness gauge 21 and the predetermined constant $a$. The output signal of multiplier 106 is divided by the output signal of squaring circuit 104 in division network 107 which derives an output signal representing:

$$\frac{\delta V_s}{\delta V_L} = \frac{V_L(T-a)\ (bV_L+2c)}{(bV_L+c)^2}$$

As indicated supra, the output signal of computer 42 is multiplied by the value of line speed error in multiplier 43 to derive a signal indicative of line speed correction.

Figure 3:
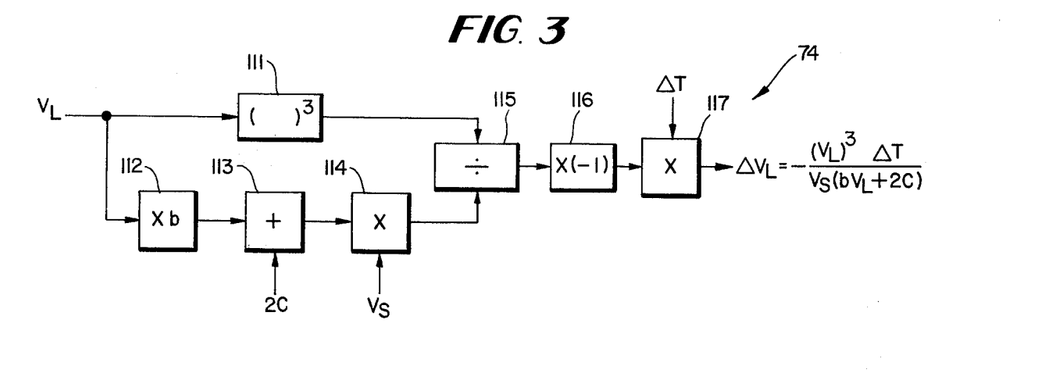
FIG. 3 is a block diagram of a change in line speed computer utilized in the system of FIG. 1.

Reference is now made to FIG. 3 of the drawing wherein there is illustrated computer 74 which responds to signals respectively derived from tachometer generator 24 and 25 and indicative of the line and screw speed, as well as the value of $\Delta T$ derived from substraction network 31 and the predetermined values of $b$ and $c$ to derive the value $\Delta V_L$ for the change in line speed when sheet thickness is outside of the deadband. The signal from tachometer representing $V_L$ is applied to a pair of parallel channels, one of which includes cubing network 111 for deriving an output signal representing $V_L^3$. The other channel includes a scaling network 112 for multiplying the line speed value by the predetermined constant $b$. The output of scaling network 112 is added to a signal indicative of the constant $2c$ in addition network 113, the output of which is multiplied in multiplier 114 by the screw speed output signal of tachometer generator 25. The output signal of cubing network 111 is divided by the output signal of multiplier 114 in division network 115, the output of which is inverted in polarity by inverting network 116 which derives an output signal commensurate with the rate of change of line speed with respect to sheet thickness as represented by:

$$\frac{\delta V_L}{\delta T} = -\frac{V_L^3}{V_s(bV_L+2c)}$$

The output signal of inverting circuit 116 is combined in multiplier 117 with the thickness error signal $\Delta T$ derived from subtraction circuit 31. The output signal of multiplying circuit 117 is thereby indicative of the change in line speed. The magnitude of the signal derived from computer 74 selectively modifies the speed of motor 18 in response to the thickness of sheet 11 being outside of the deadband region, as described supra.

Figure 4:
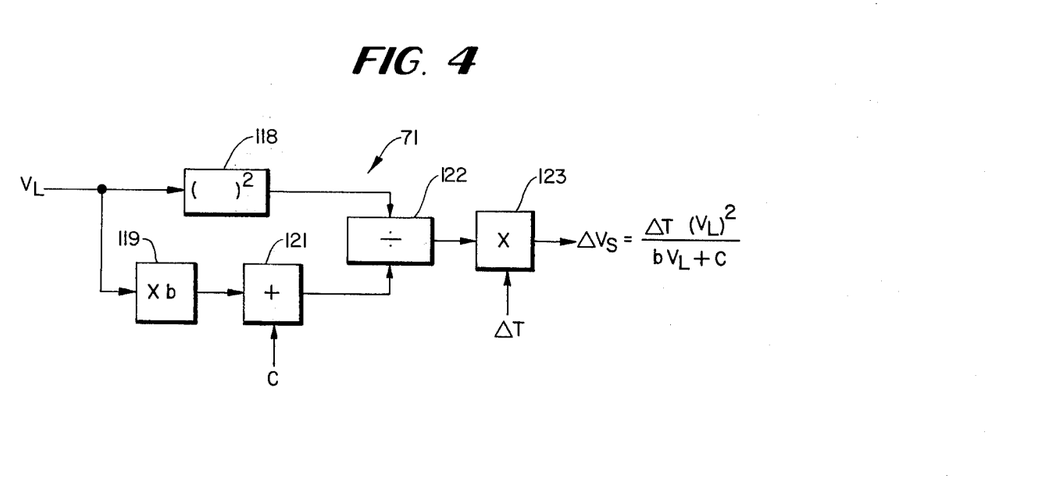
FIG. 4 is a block diagram of a change in screw speed computer employed in FIG. 1.

Reference is now made to FIG. 4 of the drawing wherein there is illustrated a circuit diagram for computer 71 which derives an output signal for the change in the speed of screw 14 when the thickness of sheet 11 is outside of the deadband region. Computer 71 is responsive to the line speed signal derived from tachometer 24, as well as to the thickness error signal derived from difference network 31 and the predetermined system constants $b$ and $c$. The signal derived from tachometer 24 indicative of $V_L$ is applied to a pair of parallel channels, one of which includes squaring circuit 118. The other channel includes scaler circuit 119 which multiplies the value of $V_L$ by the system constant $b$. The output signal of scaler circuit 119 is added to a signal commensurate with the value of $c$ in addition network 121. The output signal of squaring circuit 118 is divided by the output signal of adding circuit 121 in division circuit 122 which derives an output signal in accordance with:

$$\frac{\delta V_s}{\delta T} = \frac{V_L^2}{bV_L+c}$$

The output signal of division circuit 122 is multiplied in multiplier 123 by the thickness error signal of subtraction network 31. The output signal of multiplier 123 is therefore a signal magnitude representing change in screw speed. The change in screw speed indicating signal derived from multiplier 123 selectively increases and decreases the speed of motor 19 in response to the thickness of sheet 11 being outside of the deadband region.

While there has been described and illustrated one specific embodiment of the invention, it will be clear that variations in the details of the embodiment specifically illustrated and described may be made without departing from the true spirit and scope of the invention as defined in the appended claims. For example, the described analog computer type control system can be replaced with a hard wired digital computer or a general purpose digital computer properly programmed to operate in response to the various measurement signals to derive control signals for the speed of sheet 11 and screw 14. Gauge 21 is preferably a scanning gauge which is periodically traversed at right angles to the edges of moving sheet 11. After a traversal of the scanning gauge, the average value of the sheet thickness over a scan is computed and intermittently supplied to the controller of the present invention. In such a case, the other inputs to the controller are also intermittently derived and a new control action is performed only once in response to each scan of the gauge, in a manner well known to those skilled in the art. Also, appropriate substitutions in the mathematical relationships for the various rates of changes can be made by appropriate substitution. For example, the value of T from the basic model equation can be substituted into the equation for rate of change of screw speed with respect to line speed. In addition, visual and/or aural signals can be derived as safety indicators for an operator in response to the speed of screw 14 or sheet 11 reaching the maximum values.

We claim:

1. In an apparatus for controlling an extruder system responsive to a supply of input material, said extruder system including a screw for feeding the input material through an extruder and means for taking a sheet product formed by the extruder away from the extruder, said screw and means for taking the product away from the extruder being capable of affecting thickness and throughput of the sheet; means for measuring the thickness of the formed sheet, means for establishing a signal indicative of a deadband region for the sheet thickness, means comparing a signal indicative of the measured sheet thickness and the deadband region indicating signal for deriving first and second signals respectively indicative of the thickness being within and outside of the deadband region, means for measuring take-away speed of the sheet product, means responsive to the first signal and a signal indicative of measured take-away speed for concomitantly controlling screw speed and take-away speed, and means responsive to the second signal and a signal indicative of measured thickness for controlling at least one of screw speed and take-away speed.

2. A system for controlling an extruder system responsive to a supply of input material, said extruder system including a screw for feeding the input material through an extruder and means for taking a sheet product formed by the extruder away from the extruder, the thickness, T, of the sheet product being related to rotational speed of the screw, $V_S$, and take-away speed of the sheet from the extruder, $V_L$, by:

$$T = a + b \frac{V_S}{V_L} + c \frac{V_S}{V_L^2},$$

where:

$a$, $b$, and $c$ are predetermined constants, comprising means responsive to a measured value of $V_L$ for computing a signal indicative of the rate of change of a variable of said equation with respect to another variable of said equation, means responsive to a measured value of one of the variables of said equation for deriving an error signal for said one variable, and means responsive to the rate of change indicating signal and the derived error signal for controlling the speed of at least one of the screw rotational velocity and the take-away speed.

3. In an apparatus for controlling an extruder system responsive to a supply of input material, said extruder system including a screw for feeding the input material through an extruder, means for taking the product away from the extruder, said screw and means for taking the product away from the extruder being capable of affecting thickness and throughput of the sheet, the thickness of the sheet product, the screw rotational speed and the take-away speed being variables related by a predetermined equation, comprising means for measuring take-away speed of the sheet, means for measuring another variable of the equation related to the thickness of the formed sheet, means combining signals indicative of the measured sheet speed and the another variable for deriving a signal indicative of the rate of change of one of said variables with respect to another of said variables, means responsive to a measured value of one of the variables of said equation for deriving an error signal for said one variable, and means responsive to the rate of change indicating signal and the derived error signal for controlling the speed of at least one of the screw rotational velocity and the take-away speed.

4. In an apparatus for controlling an extruder system responsive to a supply of input material, said extruder system including a screw for feeding the input material through an extruder and means for taking a sheet product formed by the extruder away from the extruder, the thickness, T, of the sheet product being related to rotational speed of the screw, $V_S$, and take-away speed of the sheet from the extruder, $V_L$, by:

$$T = a + b \frac{V_S}{V_L} + c \frac{V_S}{V_L^2},$$

where:

$a$, $b$, and $c$ are predetermined constants, means responsive to a measured value of $V_L$ for computing a signal indicative of the rate of change of a variable of said equation with respect to another variable of said equation, means responsive to a measured value of one of the variables of said equation for deriving an error signal for said one variable, and means responsive to the rate of change indicating signal and the derived error signal for deriving a control signal for the speed of at least one of the screw rotational velocity and the take-away speed, and means responsive to the control signal for controlling the speed of the at least one of the screw rotational velocity and the take-away speed.

5. In an apparatus for controlling an extruder system responsive to a supply of input material, said extruder system including a screw for feeding the input material through an extruder and means for taking a sheet product formed by the extruder away from the extruder, the thickness, T of the sheet product being related to rotational speed of the screw, $V_S$, and take-away speed of the sheet from the extruder, $V_L$, by:

$$T = a + b \frac{V_S}{V_L} + c \frac{V_S}{V_L^2},$$

where:

$a$, $b$, and $c$ are predetermined constants, means responsive to a measured value of $V_L$ for computing a signal indicative of the rate of change of a variable of said equation with respect to another variable of said equation means responsive to a measured value of one of the variables of said equation for deriving an error signal for said one variable, and means responsive to the rate of change indicating signal and the derived error signal for deriving a control signal for the speed of the screw rotational velocity, said means for deriving the rate of change indicating signals including means for deriving a signal representing rate of change of screw speed with respect to take-away speed, the error signal deriving means including means for deriving an error signal for take-away speed, and the control signal deriving means including means for multiplying the take-away speed error signal and the signal representing rate of change of screw speed with respect to take-away speed, and means responsive to the control signal for controlling the screw rotational velocity.

6. In an apparatus for controlling an extruder system responsive to a supply of input material, said extruder system including a screw for feeding the input material through an extruder and means for taking a sheet product formed by the extruder away from the extruder, the thickness, $T$, of the sheet product being related to rotational speed of the screw, $V_S$, and take-away speed of the sheet from the extruder, $V_L$, by:

$$T = a + b \frac{V_S}{V_L} + c \frac{V_S}{V_L^2}$$

where:

$a$, $b$, and $c$ are predetermined constants means responsive to a measured value of $V_L$ for computing a signal indicative of the rate of change of a variable of said equation with respect to another variable of said equation, means responsive to a measured value of one of the variables of said equation for deriving an error signal for said one variable, and means responsive to the rate of change indicating signal and the derived error signal for deriving a control signal for the speed of the take-away speed, said means for deriving the rate of change indicating signals includes means for deriving the signal respresenting rate of change of take-away speed with respect to sheet thickness, the error signal deriving means including means for deriving an error signal for sheet thickness, and the control signal deriving means including means for multiplying the sheet thickness error signal and the signal representing rate of change of take-away speed with respect to sheet thickness, and means responsive to control signal for controlling the take-away speed.

7. In an apparatus for controlling an extruder system responsive to a supply of input material, said extruder system including a screw for feeding the input material through an extruder and means for taking a sheet product formed by the extruder away from the extruder, the thickness, $T$, of the sheet product being related to rotational speed of the screw, $V_S$ and take-away speed of the sheet from the extruder, $V_L$, by:

$$T = a + b \frac{V_S}{V_L} + c \frac{V_S}{V_L^2},$$

where:

$a$, $b$, and $c$ are predetermined constants means responsive to a measured value of $V_L$ for computing a signal indicative of the rate of change of a variable of said equation with respect to another variable of said equation, means responsive to a measured value of one of the variables of said equation for deriving an error signal for said one variable, and means responsive to the rate of change indicating signal and the derived error signal for deriving a control signal for the speed of the screw rotational velocity, said means for deriving the rate of change indicating signals includes means for deriving a signal respresenting rate of change of screw speed with respect to sheet thickness, the error signal deriving means including means for deriving an error signal for sheet thickness and the control signal deriving means including means for multiplying the sheet thickness error signal and the signal representing rate of change of screw speed with respect to sheet thickness, said means for deriving the signal representing rate of change of screw speed with respect to thickness includes means for deriving the rate of change signal in accordance with:

$$\frac{V_L^2}{bV_L + c}.$$

and means responsive to the control signal for controlling the screw rotational velocity.

8. In an apparatus for controlling an extruder system responsive to a supply of input material, said extruder system including a screw for feeding the input material through an extruder and means for taking a sheet product formed by the extruder away from the extruder, said screw and means for taking the product away from the extruder being capable of affecting thickness and throughput of the sheet; means for measuring the thickness of the formed sheet, means for measuring the rate at which the input material is fed through the extruder, means for measuring take-away speed of the sheet product from the extruder, and means responsive to the measured speed, the measured rate, and the measured sheet thickness for deriving a control signal for at least one of the take-away means and the screw rotational velocity, and means responsive to the control signal for controlling the speed of the at least one of the screw rotational velocity and the take-away speed.

9. In an apparatus for controlling an extruder system responsive to a supply of input material, said extruder system including a screw for feeding the input material through an extruder and means for taking a sheet product formed by the extruder away from the extruder, said screw and means for taking the product away from the extruder being capable of affecting thickness and throughout of the sheet; means for measuring the thickness of the formed sheet, means for measuring the rate at which the input material is fed through the extruder, means for measuring take-away speed of the sheet product from the extruder, and means responsive to the measured speed, the measured rate, and the measured sheet thickness for deriving a control signal for the screw rotational velocity, said means for deriving including: means for deriving a signal representing rate of change of screw speed with respect to take-away speed and an error signal for take-away speed, and means for multiplying the take-away speed error signal and the signal representing rate of change of screw speed with respect to take-away speed, and means responsive to the control signal for controlling the screw rotational velocity.

10. In an apparatus for controlling an extruder system responsive to a supply of input material, said extruder system including a screw for feeding the input material through an extruder and means for taking a sheet product formed by the extruder away from the extruder, said screw and means for taking the product away from the extruder being capable of affecting thickness and throughput of the sheet; means for measuring the thickness of the formed sheet, means for measuring the rate at which the input material is fed through the extruder, means for measuring take-away speed of the sheet product from the extruder, and means responsive to the measured speed, the measured rate, and the measured sheet thickness from deriving a control signal for the take-away means, said means for deriving including: means for deriving a signal representing rate of change of take-away speed with respect to sheet thickness and an error signal for sheet thickness, and means for multiplying the sheet thickness error signal and the signal representing rate of change of take-away speed with respect to sheet thickness, and means responsive to the control signal for controlling the take-away speed.

11. In an apparatus for controlling an extruder system responsive to a supply of input material, said extruder system including a screw for feeding the input material through an extruder, and means for taking the product away from th extruder being capable of affecting thickness and throughput of the sheet, the thickness of the sheet product, the screw rotational speed and the take-away speed being variables related by a predetermined equation, means for measuring take-away speed of the sheet, means for measuring another variable of equation related to the thickness of the formed sheet, means combining signals indicative of the measured sheet speed and the another variable for deriving a signal indicative of the rate of change of one of said variables with respect to another of said variables, means responsive to a measured value of one of the variables of said equation for deriving an error signal for said one variable, and means responsive to the rate of change indicating signal and the derived error signal for deriving a control signal for the speed of at least one of the screw rotational velocity and the take-away speed, and means responsive to the control signal for controlling the speed of the at least one of the screw rotational velocity and the take-away speed.

12. In an apparatus for controlling an extruder system responsive to a supply of input material, said extruder system including a screw for feeding the input material through an extruder, and means for taking the product away from the extruder, said screw and means for taking the product away from the extruder being capable of affecting thickness and throughput of the sheet, the thickness of the sheet product, the screw rotational speed and the take-away speed being variables related by a predetermined equation, means for measuring take-away speed of the sheet, means for measuring another variable of the equation related to the thickness of the formed sheet, means combining signals indicative of the measured sheet speed and the another variable for deriving a signal indicative of the rate of change of one of said variables with respect to another of said variables, means responsive to a measured value of one of the variables of said equation for deriving an error signal for said one variable, and means responsive to the rate of change indicating signal and the derived error signal for deriving a control signal for the speed of the screw rotational velocity, said means for deriving the rate of change indicating signals including means for deriving a signal representing rate of change of screw speed with respect to take-away speed, the error signal deriving means including means for deriving an error signal for take-away speed, and the control signal deriving means including means for multiplying the take-away speed error signal and the signal representing rate of change of screw speed with respect to take-away speed, and means responsive to the control signal for controlling the screw rotational velocity.

13. In an apparatus for controlling an extruder system responsive to a supply of input material, said extruder system including a screw for feeding the input material through an extruder, and means for taking the product away from the extruder, said screw and means for taking the product away from the extruder being capable of affecting thickness and throughput of the sheet, the thickness of the sheet product, and the screw rotational speed and the take-away speed being variables related by a predetermined equation, means for measuring take-away speed of the sheet, means for measuring another variable of the equation related to the thickness of the formed sheet, means combining signals indicative of the measured sheet speed and the another variable for deriving a signal indicative of the rate of change of one of said variables with respect to another of said variables, means responsive to a measured value of one of the variables of said equation for deriving an error signal for said one variable, and means responsive to the rate of change indicating signal and the derived error signal for deriving a control signal for the speed of the take-away speed, said means for deriving the rate of change indicating signals including means for deriving a signal representing rate of change of take-away speed with respect to sheet thickness, the error signal deriving means including means for deriving an error signal for sheet thickness, and the control signal deriving means including means for multiplying the sheet thickness error signal and the signal representing rate of change of take-away speed with respect to sheet thickness, and means responsive to the control signal for controlling the take-away speed.

14. In an apparatus for controlling an extruder system responsive to a supply of input material, said extruder system including a screw for feeding the input material through an extruder and means for taking a sheet product formed by the extruder away from the extruder, said screw and means for taking the product away from the extruder being capable of affecting thickness and throughput of the sheet, means for measuring the rate at which material is fed through the extruder, means for measuring another parameter related to sheet thickness, and means combining signals indicative of the measured screw rotational speed and the measured sheet thickness related parameter for deriving a control signal for one of the actuators affecting the sheet thickness, and means responsive to the control signal for controlling the one actuator.

15. In an apparatus for controlling an extruder system responsive to a supply of input material, said extruder system including a screw for feeding the input material through an extruder and means for taking a sheet product formed by the extruder away from the extruder, said screw and means for taking the product away from the extruder being capable of affecting thickness and throughput of the sheet, means for measuring the rate at which material is fed through the extruder, means for measuring another parameter related to sheet thickness, and means combining signals indicative of the measured screw rotational speed and the measured sheet thickness related parameter for deriving a control signal for screw speed changes, said means for deriving including: means for deriving a signal representing rate of change of screw speed with respect to take-away speed and an error signal for take-away speed, and means for multiplying the take-away speed error signal and the signal representing rate of change of screw speed with respect to take-away speed, and means responsive to the control signal for controlling the screw rotational velocity.

16. In an apparatus for controlling an extruder system responsive to a supply of input material, said extruder system including a screw for feeding the input material through an extruder and means for taking a sheet product formed by the extruder away from the extruder, said screw and means for taking the product away from the extruder being capable of affecting thickness and throughput of the sheet, means for measuring the rate at which material is fed through the extruder, means for measuring another parameter related to sheet thickness, and means combining signals indicative of the measured screw rotational speed and the measured sheet thickness related parameter for deriving a control signal for take-away speed changes, said means for deriving including means for deriving a signal representing rate of change of take-away speed with respect to sheet thickness and an error signal for sheet thickness, and means for multiplying the sheet thickness error signal and the signal representing rate of change of take-away speed with respect to sheet thickness, and means responsive to the control signal for controlling the take-away speed.

17. In an apparatus for controlling an extruder system responsive to a supply of input material, said extruder system including a screw for feeding the input material through an extruder and means for taking a sheet product formed by the extruder away from the extruder, said screw and means for taking the product away from the extruder being capable of affecting thickness and throughput of the sheet, means for measuring the rate at which material is fed through the extruder, means for measuring another parameter related to sheet thickness, and means combining signals indicative of the measured screw rotational speed and the measured sheet thickness related parameter for deriving a control signal for screw speed changes, said means for deriving including: means for deriving a signal representing rate of change of screw speed with respect to sheet thickness and an error signal for sheet thickness, and means for multiplying the sheet thickness error signal and the signal representing rate of change of screw speed with respect to sheet thickness, and means responsive to the control signal for controlling the screw rotational velocity.

* * * * *